A. J. DALLEMAGNE & L. TRIBOULET.
Photographic Monocular Glasses.
No. 146,052.            Patented Dec. 30, 1873.
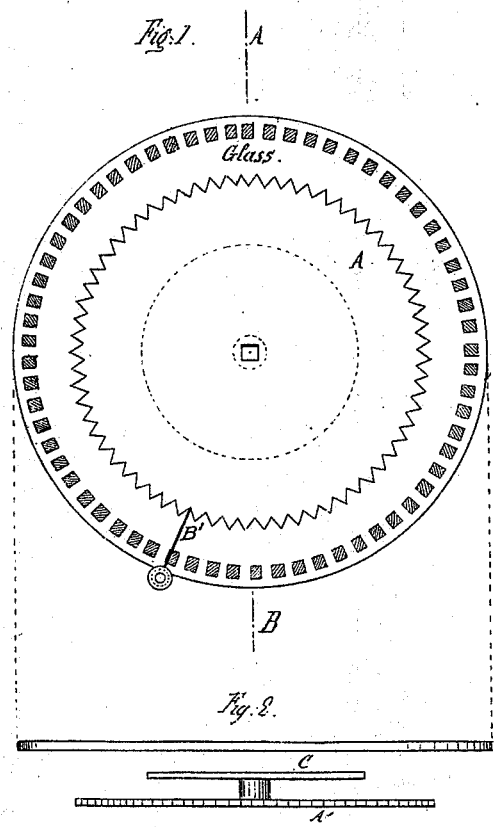
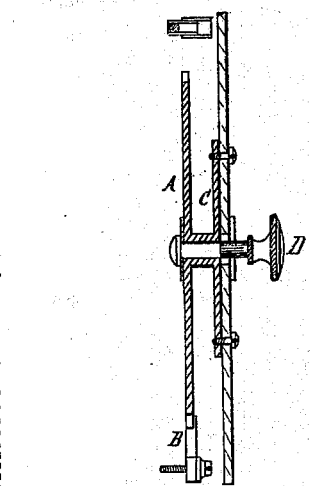

UNITED STATES PATENT OFFICE.

AUGUSTE J. DALLEMAGNE AND LOUIS TRIBOULET, OF PARIS, FRANCE.

IMPROVEMENT IN PHOTOGRAPHIC MONOCULAR GLASSES.

Specification forming part of Letters Patent No 146,052, dated December 30, 1873; application filed July 16, 1873.

*To all whom it may concern:*

Be it known that we, AUGUSTE JACQUES DALLEMAGNE and LOUIS TRIBOULET, both of Paris, in the Department of the Seine and Republic of France, have invented certain Improvements in Photographic Monocular Glasses, of which the following is a specification:

Our invention relates to the combination of photographic proofs or pictures in a restricted space in such a manner as to permit their easy classification, and their being presented successively to the view, the object being to render a handsome collection of photographs less costly, and the classification of each proof, as regards dimensions, less inconvenient than is now the case.

Figure 1 is a front elevation of a glass or plate carrying a series of photographic proofs according to our invention. Fig. 2 is a side view of the mechanical arrangement by which the photographs are set in motion, and Fig. 3 is a section of Fig. 2.

Around the circumference of the glass or plate shown in Fig. 1 is a series of photographic proofs reduced to their smallest dimensions short of being of the kind known as "microscopic." A considerable number of proofs are thus set in a circular line upon this glass, which is placed in a casing and a rotary motion given to it, so as to cause each of the proofs to pass successively beneath a magnifying glass or lens. The means of obtaining this series of pictures present no novelty; it is simply by reduction.

In order that in the rotation of the glass each of the proofs may come facing the magnifying-lens, a stop must be set according to the position of each of the proofs, to arrest the rotation of the glass at each proof. This is effected in the arrangement shown by the wheel A' (the number of teeth upon which is regulated by the number of proofs) and the spring B' fixed to the casing. The wheel A' is in connection with the glass by a double plate, C, pierced with two holes, communicating with two others pierced in the glass, and through which pass two screws. Thus, if a rotary motion be given to the knob D, the glass carrying the photographs, the plate C, and the toothed wheel A' will follow this impulsion until it is no longer given, when the spring B', which has been made to yield, will stop the rotary motion by gearing into one of the teeth of the wheel A'.

Our invention is susceptible of many variations, and might be arranged to give stereoscopic effects by rendering it binocular.

The glass above described may be of clear, or of unpolished or ground, glass, and might be replaced by an opaque body, upon which proofs would be placed to be lit up by the reflection of a glass or otherwise.

Transparent proofs might even be employed fastened upon a carte cut out for this purpose, or the carte itself might be of a transparent material, such as mica or other similar body.

We claim as our invention—

The case B, provided with an opening from front to back for the reception of a magnifying-lens, the revolving glass plate or picture-disk A, toothed wheel A', with its operating-shaft, spring-pawl B', and thumb-screw D, all constructed, combined, and arranged substantially as and for the purpose set forth.

AUGUSTE JACQUES DALLEMAGNE.
LOUIS TRIBOULET.

Witnesses:
C. GUY,
H. BARRE.